United States Patent [19]

Matsumoto

[11] Patent Number: 5,565,859
[45] Date of Patent: Oct. 15, 1996

[54] METHOD OF DETECTING A PAGING CHANNEL IN A MULTI-FREQUENCY RADIO PAGER NETWORK

[75] Inventor: Mariko Matsumoto, Tokyo, Japan

[73] Assignee: NEC Corporation, Japan

[21] Appl. No.: 373,454

[22] Filed: Jan. 17, 1995

Related U.S. Application Data

[63] Continuation of Ser. No. 934,165, Aug. 24, 1992, abandoned.

[30] Foreign Application Priority Data

Aug. 23, 1991 [JP] Japan .................................. 3-235649

[51] Int. Cl.⁶ ........................... G02B 5/22; H04Q 7/00
[52] U.S. Cl. ................... 340/480; 340/825.44; 379/60; 455/33.2
[58] Field of Search ...................... 340/825.44, 825.48; 379/59, 60; 455/33.2, 33.3, 33.4, 34.2

[56] References Cited

U.S. PATENT DOCUMENTS

| | | | |
|---|---|---|---|
| 4,144,412 | 3/1979 | Ito et al. | 455/33.4 |
| 4,747,101 | 5/1988 | Akaiwa et al. | 379/59 |
| 5,058,201 | 10/1991 | Ishii | 455/33.2 |
| 5,067,147 | 11/1991 | Lee | 455/33.3 |
| 5,078,905 | 2/1992 | Kuramatsu et al. | 340/825.44 |
| 5,254,986 | 10/1993 | De Luca | 340/825.44 |

FOREIGN PATENT DOCUMENTS

| | | |
|---|---|---|
| 8904025 | 5/1989 | WIPO . |
| 9003041 | 3/1990 | WIPO . |
| 9106190 | 5/1991 | WIPO . |
| 9107064 | 5/1991 | WIPO . |

OTHER PUBLICATIONS

Reports of the CCIR, 1990, Annex 1 to Volumn VIII pp. 12–18.

European Radio Message System (ERMES), pr ETS 300 133–4 Jan. 1991.

*Primary Examiner*—Michael Horabik
*Assistant Examiner*—Edward Merz
*Attorney, Agent, or Firm*—Ostrolenk, Faber, Gerb & Soffen, LLP

[57] ABSTRACT

In order to detect a paging channel assigned to a pager in a shorter time in a frequency divided pager network system, a plurality of paging channels given priorities in channel searching are separately assigned to the paging areas in a manner wherein reuse in adjacent paging areas is avoided. A frequency subset number and frequency subset indicators related thereto, are stored in a memory in a pager. Subsequently, paging channels available in the system are allocated to the frequency subset indicators. Further, a relationship between the frequency subset indicators and the corresponding paging channels is arranged in the form of a table and then stored in the pager. Then, the paging channels are assigned to the paging areas according to the relationship. The above mentioned paging channels given priorities in channel detection are monitored so as to detect which priority channel is transmitted to the pager. In the event that the pager detects one of the priority paging channels, the pager is tuned to other paging channels according to the relationship.

4 Claims, 10 Drawing Sheets

METHOD OF DETECTING A PAGING CHANNEL IN A MULTI-FREQUENCY RADIO PAGER NETWORK

This is a continuation of application Ser. No. 07/934,165 filed on Aug. 24, 1992, now abandoned.

BACKGROUND OF THE INVENTION

1. Field of the Invention

The present invention relates to a method of detecting a paging channel in a multifrequency radio pager network wherein an overall service coverage area is divided into a plurality of small paging areas. More specifically, the present invention relates to such a method wherein the paging channel to be detected is dynamically assigned to one of a plurality of frequency subset indicators in a given paging area. The frequency subset indicators are related to one frequency subset number.

2. Description of the Prior Art

It is known in the art that a radio pager is a device which alerts a subscriber to call a predetermined phone number by means of sound and/or flashing light.

Recently, in order to transmit more pieces of information to a subscriber at one calling, a radio pager which is equipped with a display function, has proven very popular and is gradually replacing the above mentioned older style pagers.

A radio paging system currently in use is designed such that a pager is able to receive its paging messages, via a predetermined paging channel, throughout an entire service coverage area to which the subscriber has subscribed. In other words, there exists no radio pager system wherein a service coverage area is divided into a plurality of small paging areas and wherein a pager uses different frequencies in different paging areas.

However, merely by way of example, the European Telecommunications Standards Institute has proposed to provide frequency divided network operations in the European Radio Message System (ERMES). The frequency divided network operation implies that adjacent paging areas use different frequencies. Within one network a pager should use adjacent frequencies in adjacent paging areas.

In the frequency divided (viz., multifrequency) network, each of the pagers is informed on which channel to expect its messages. This is accomplished with a combination of a frequency subset indicator (FSI) transmitted to all pagers in a system information partition and a frequency subset number (FSN) permanently stored in the pager. The frequency subset indicator (FMI) shall be transmitted for all pagers.

FIG. 1 is a chart which depicts a format of the paging signal which is transmitted to the pagers in the ERMES. The code format Shown in FIG. 1 starts with a synchronization part which consists of a preamble word (PR) and a synchronization word (SYN). A system information partition comes next which consists of two system information (SI, SI') parts and a supplementary system information (SSI) part. The system information partition is followed by address and message partitions as shown.

FIG. 2 is a diagram which illustrates a relationship between frequency subset indicators (FSIs: 30–00) and frequency subset numbers (FMNs: 00–15), both of which have been proposed by the above mentioned ERMES. Each of all pagers shall be assigned a single FSN between 00 and 15. Each FSN defines a unique subset of five FSIs as indicated in FIG. 2. It is intended that the FSIs are used in descending order. Thus, in the event that a single channel is used within a paging area, the transmitted FSI is set to 30. On the other hand, if two channels are used within a paging area, the transmitted FSIs are set to 28 and 29. The FSI(s) transmitted is located in the system information SI' in the code format of FIG. 1.

It is assumed that the number of frequency channels assigned to an overall service coverage area is 16 and depicted by F0–F15. It should be noted that the FSIs do not correspond directly to frequency channel numbers. In more specific terms, a system operator allocates one or more of the 16 channels F0–F15 to one or more of the thirty FSIs (viz., FSI values of 31 to 00) in each paging area. Thus, the FSI/FSN arrangement renders it possible to have a dynamic number of channels in use.

The FSI broadcast on the paging channel indicates that messages wall be transmitted for pagers with an FSN in the FSI's subset. For example, when the FSI on a channel equals 27, only messages to pagers with FSNS 12, 13, 14 and 15 will be carried. Conversely, a pager with FSN=12 should look for its messages, only on one of the channels broadcasting FSI values of 12, 22, 27, 29 or 30.

Merely for the convenience of description it is assumed that:

(a) the pager with FSN=12 enters a given paging area;

(b) the pager has previously stored FSI values of 12, 22, 27, 29 and 30 in a memory it is equipped with; and (c) four frequency channels F15, F10, F8 and F2 are used in the paging area in question and assigned respectively to the FSIs of 27, 26, 25 and 24 as indicated in FIG. 2.

With these assumptions, the pager with FSN=12 has to detect channel F15 which has been assigned to FSI=27, one of its five FSIs, and then fix itself one channel F15. In this end, the pager begins to search for the channel F15 by sequentially changing the tuning frequencies in a predetermined order using a frequency synthesizer it is equipped with. It is further assumed that the channel searching is implemented in an ascending order (viz., from F0 to F15) by way of example.

The pager is firstly tuned to the frequency F0. Since F0 is not in use in this particular case, the pager tuning proceeds to the next frequency F1 which is also not in use in this case. Following this, the pager is tuned to F2. However, the FSI value of 24 transmitted on the channel F2 has not been assigned to the pager in question and accordingly, the pager is subsequently tuned to the following channel frequencies (viz., from F02 to F15).

When the pager is eventually tuned to the channel F15, it detects the FSI=27 in the system information partition (FIG. 1) on the channel F15 and is fixed to same and awaits the forthcoming message reception.

The above mentioned prior art techniques have suffered from the difficulty in that the number of channel tuning operations is apt to be undesirably large before the assigned channel is detected, and in the worst case is carried out 16 times.

This problem is especially disagreeable in the case where a pager subscriber frequently moves from one paging area to another.

FIG. 3 schematically illustrates such a case wherein a service coverage area is divided into 6 paging areas A1–A6 by way of example. It is assumed that the paging areas A1–A6 have been assigned the frequency channels F0, F2–F4, F7–F8, F10–12 and F14–F15 as indicated. If a given pager moves from a point M to N along a broken line, the pager is required to search for the channel assigned thereto every time it enters the adjacent areas. As mentioned above, the pager is unconditionally, successively tuned to the channels in a predetermined order and, accordingly the tuning operations are time consuming.

SUMMARY OF THE INVENTION

It is an object of the present invention to provide a method by which a frequency channel assigned to a pager can be found in a shorter time.

In brief, the above object is achieved by a method wherein in order to detect a paging channel assigned to a pager in a shorter time in a frequency divided pager network system, a plurality of paging channels which are given priorities in channel searching are separately assigned to the paging areas in a manner wherein reuse among adjacent areas is avoided. A frequency subset number and frequency subset indicators related thereto, are stored in a pager. Subsequently, paging channels available in the system ere allocated to the frequency subset indicators. Further, a relationship between the frequency subset indicators and the corresponding paging channels is arranged in the form of a table and then stored in the pager. Then, the paging channels ere assigned to the paging areas according to the stored relationship. The above mentioned paging channels given priorities in channel detection are monitored and are transmitted to the pager. In the event that the pager detects one of the paging channels with priorities, the pager is tuned to other paging channels according to the stored relationship.

More specifically an aspect of the present invention is concerned with a frequency divided pager network system whose service coverage area is divided into a plurality of paging areas. A paging channel is separately determined for each of the paging areas in connection with each of pagers. Each pager being previously assigned to one of a plurality of frequency subset numbers. Each paging channel is assigned to one of a plurality of frequency subset indicators which are related to the frequency subset numbers.

A method embodying the present invention comprises the steps of: (a) determining a plurality of first paging channels which are separately assigned to the paging areas in a manner wherein reuse in adjacent areas is avoided; (b) storing a frequency subset number and frequency subset indicators related thereto in a pager; (c) assigning paging channels available in the system to the frequency subset indicators and arranging a relationship between the frequency subset indicators and the corresponding paging channels in the form of a table; (d) allocating the paging channels to the paging areas according to the stored relationship; (e) monitoring for the first paging channels transmitted to the pager; and (f) tuning the pager to paging channels according to the relationship in the event that the pager detects one of the first paging channels.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 4:
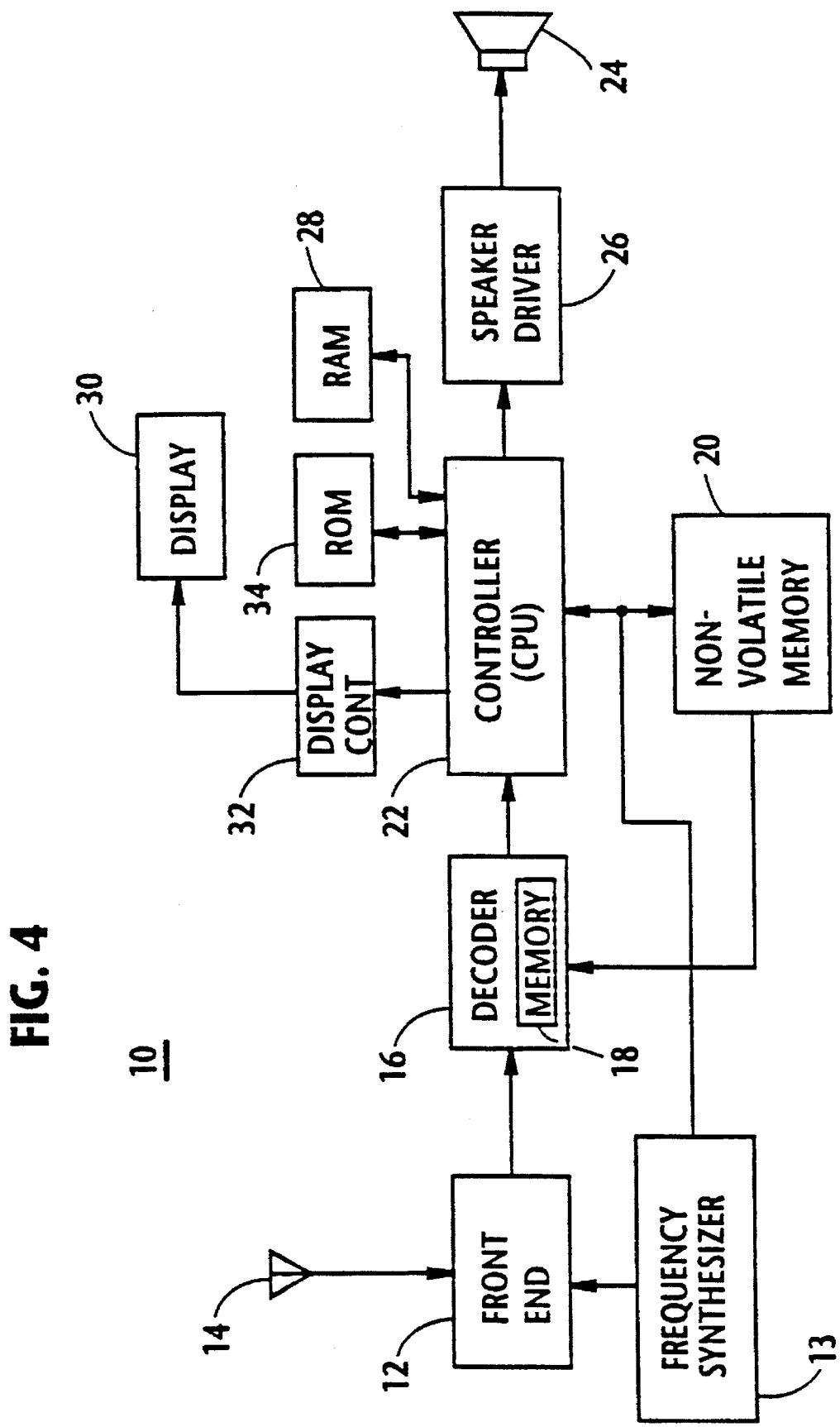
FIG. 4 is a block diagram showing a pager to which the present invention is applicable.

Referring now to FIG. 4, there is shown in block diagram form a hardware arrangement of a pager 10 to which the present invention is applicable.

It is assumed that the pager 10 has not yet been tuned to the channel which has been assigned thereto. It is necessary, therefore, to ascertain the channel for enabling the pager 10 to receive paging messages directed thereto. This operation is required in the event that the pager 10 is initially energized due to the replacement of a battery or if the pager 10 is transported into an adjacent paging area, etc.

As shown in FIG. 4, a front end (viz., radio section) 12 is provided for amplifying and demodulating a code-modulated carrier wave (viz., channel frequency) received by an antenna 14. The front end 12 comprises a high frequency amplifier, a frequency converter, an IF amplifier and a discriminator (not illustrated in FIG. 4). The front end 12 is tuned to one of the above mentioned channels F0–F15 (for example) under control of a frequency synthesizer 13 and a controller (viz., CPU (Central Processing Unit)) 22. In the event that the front end 12 is successfully tuned to an incoming carrier wave, the output of the front end 12 is applied to a decoder 16. Otherwise, the controller 22 instructs the front end 12 to proceed to the next channel frequency using the synthesizer 13. These operations are repeated until the front end 12 is successfully tuned to the incoming channel frequency.

Figure 1:
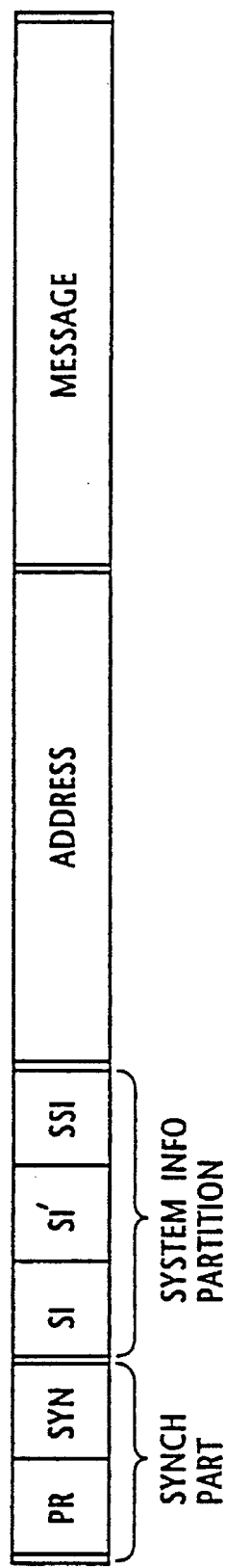
FIG. 1 is a chart depicting a known format of the signals which are applied to a pager, this figure being applicable to the prior art and also being useful for explaining the present invention end having been referred to in the opening paragraphs of the instant disclosure.

The decoder 16 is arranged to compare an FSI transmitted on the "tuned" channel with one of the FSIs which have previously been assigned to the pager 10 and stored in a memory 18. The FSI transmitted is located in the section SI' of the system information partition (FIG. 1). The FSIs in the memory 18 are written thereinto from a non-volatile memory 20 when the pager 10 is switched on. The FSIs stored in the pager 10 will be referred to in more detail later.

If the decoder 16 fails to detect that the FSI transmitted on the "tuned" channel coincides with one of the FSIs previously stored in the memory 18, the controller 22 instructs the front end 12 to tune to the next channel using the synthesizer 13.

On the other hand, if the decoder 15 detects that the received FSI on the "tuned" channel coincides with one of the FSIs stored in the pager 10, the controller 22 fixes the tuning frequency (viz., channel) at the front end 12 and thus terminates the channel search operations. Following this, the pager 10 enters into a standby mode for receiving any paging messages directed thereto within the paging area wherein the pager 10 has ascertained that the received FSI on the "tuned" channel coincides with one of the FSIs stored in the pager 10.

After the pager 10 has entered into the standby mode, when it receives a signal transmitted over the paging channel which has been fixed by the above mentioned operations, the decoder 16 proceeds to compare an incoming pager address code with a pager ID (Identification) code stored in the memory 18. The pager ID code in the memory 18 is written therein from a non-volatile memory 20 when the pager 10 is switched on.

In the event that the incoming pager address code coincides with the pager ID code, the decoder 16 applies a message signal, which follows the coincident pager address code, to the controller 22.

Subsequently, the controller 22 energizes a speaker 24 by way of a speaker driver 36. Although not shown in FIG. 4, a light source such as an LED (Light Emitting Diode) or the like, may be installed to provide a visible signal in addition to the audible one produced by the speaker 24. Further, the controller 22 stores the message in a RAM (Random Access Memory) 28 and simultaneously induces the same to appear on a display 30 using a display controller 32 in a manner known in the art.

The controller 22 is arranged to control the overall operations of the pager 10 using a program which is previously stored in a ROM 34.

The present invention will be discussed in more detail with reference to FIGS. 5–11.

Figure 2:
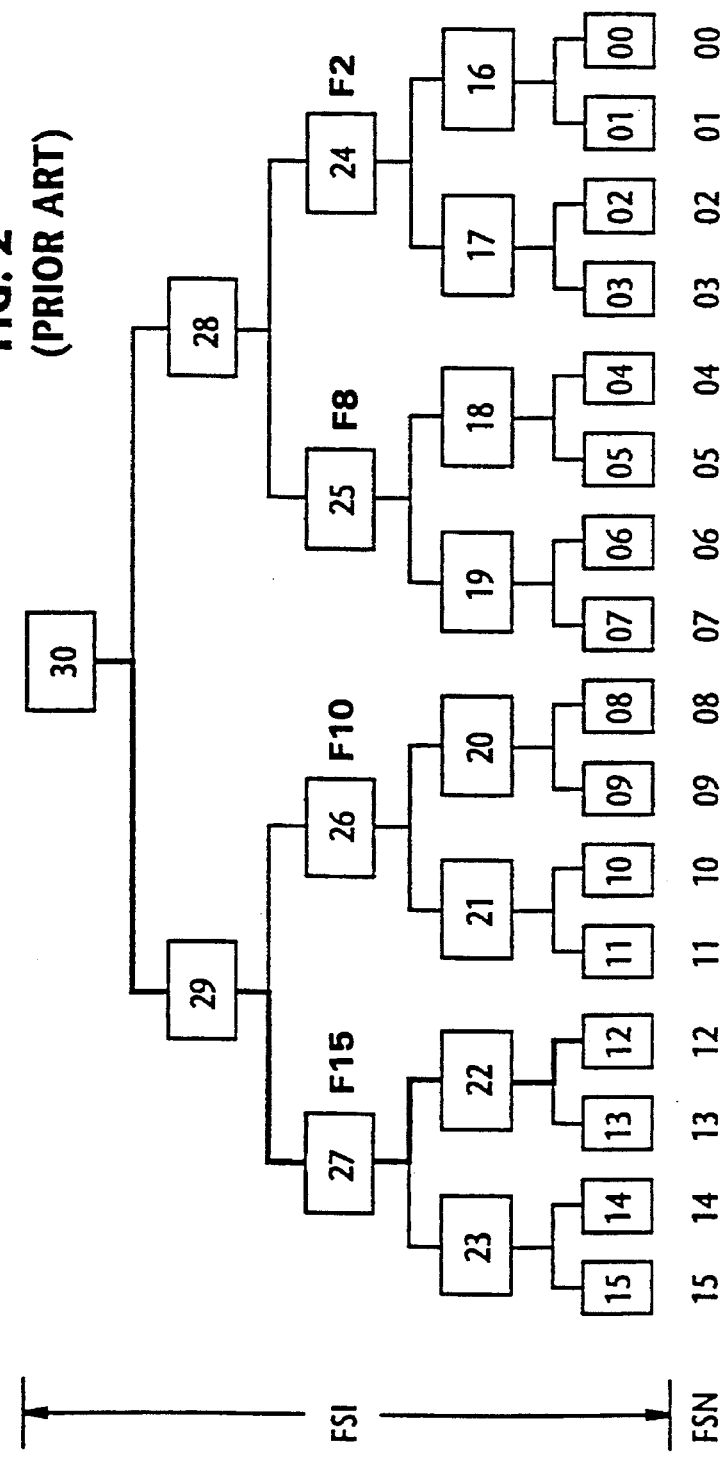
FIG. 2 shows an FSI/FSN relationship in a known paging system which has been discussed in the opening paragraphs of the instant disclosure.
Figure 3:
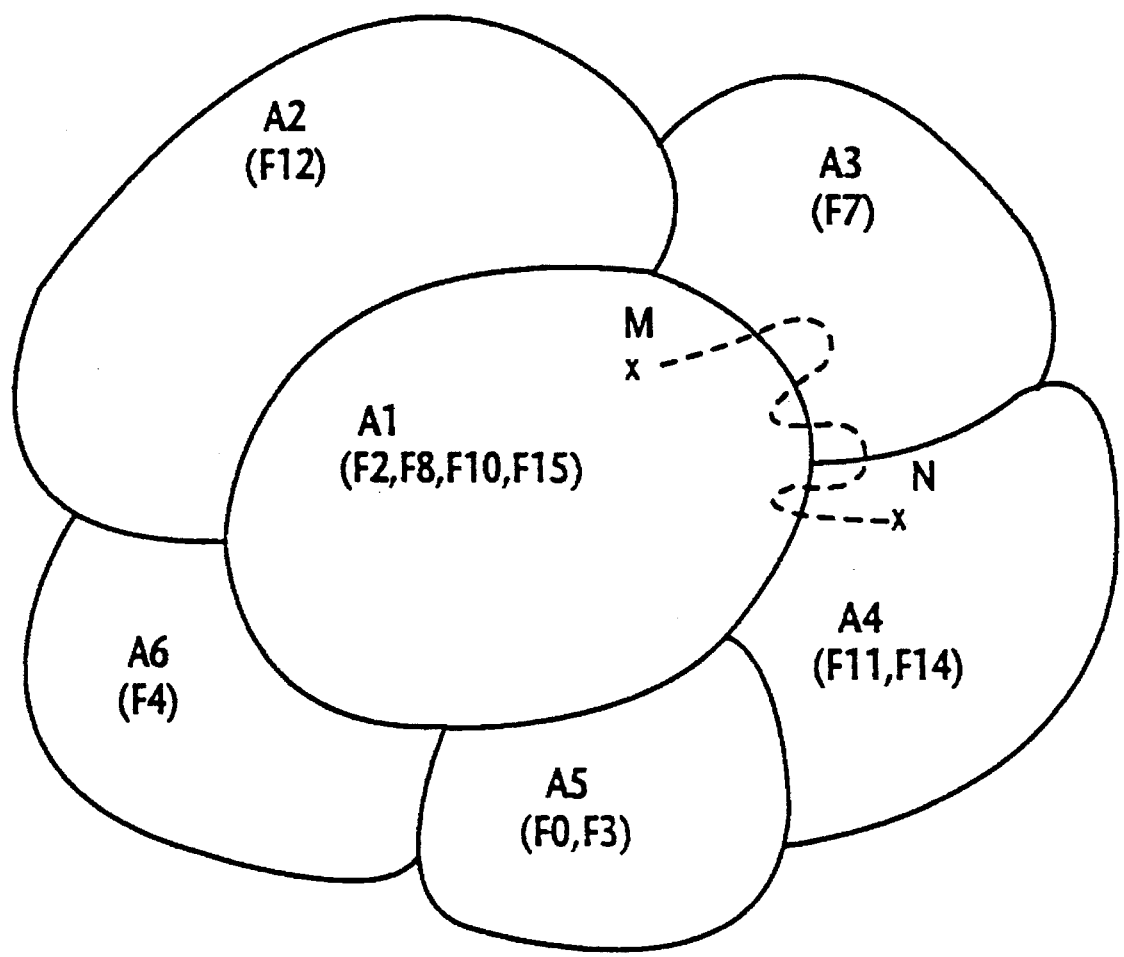
FIG. 3 is an illustration depicting the movement of a subscriber in and out of a number of different paging areas in the known paging system.

As mentioned in the opening paragraphs of the instant specification, all pagers are assigned an FSN between 0 and 15. Further, each FSN defines a unique subset of five FSIs as discussed above in connection with FIG. 2.

Figure 11:
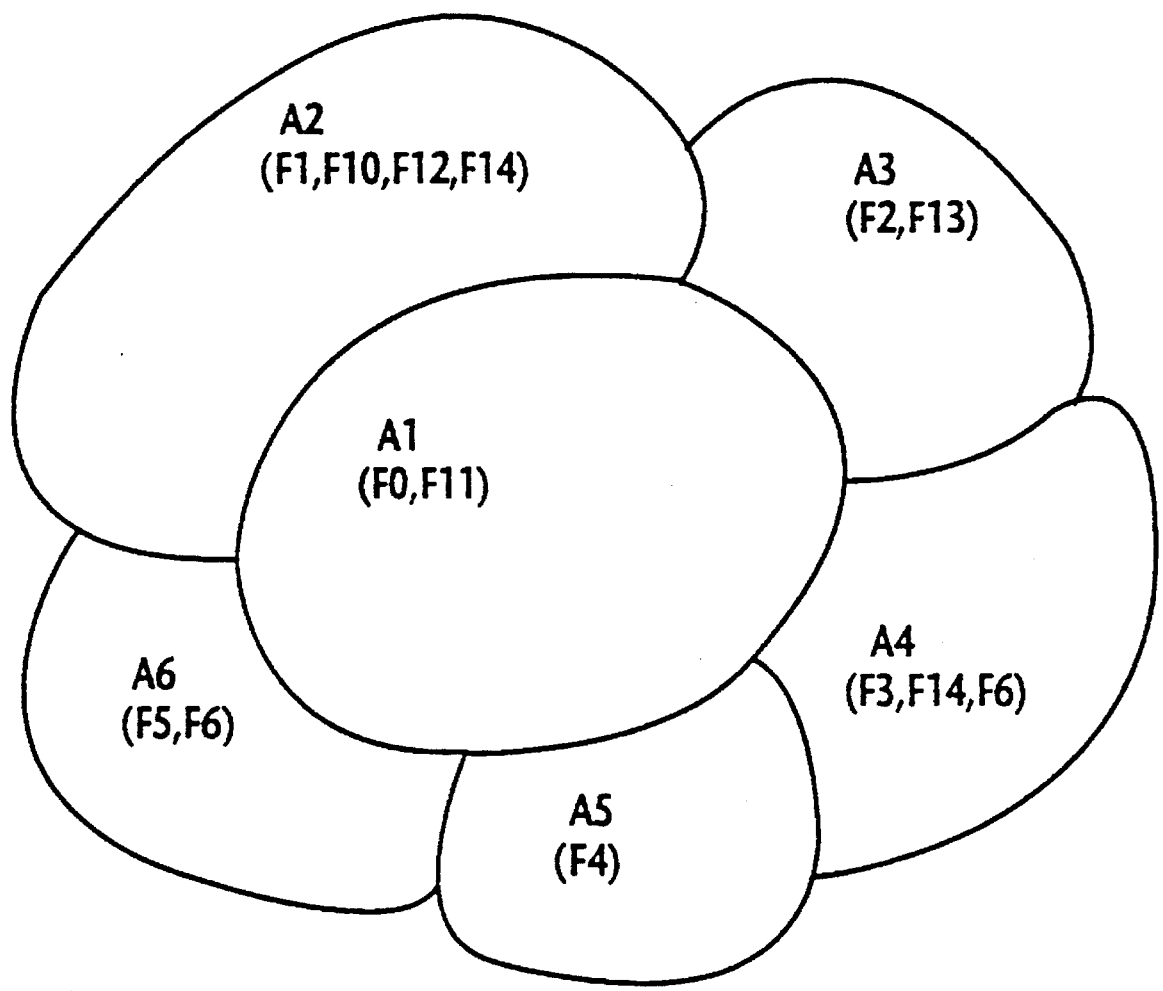
FIG. 11 is an illustration depicting an allocation of paging channels in paging areas according to an example of the present invention.

It is assumed that the service coverage area of a multi-channel pager network is divided into six paging areas A1–A6 as shown schematically in FIG. 11. According to one embodiment of the present invention, each of the FSIs 00–03 and 14–30 is assigned a paging channel in each of the paging areas A1–A6 as shown in FIGS. 5–10, respectively. The relationship of each of the FSIs and the corresponding paging channels shown in FIGS. 5–10, is previously stored, in the form of a look-up table, in the non-volatile memory 20 of each pager (FIG. 4). Further, the paging channels F0–F5 are separately assigned to the paging areas A1–A6 in a manner wherein none of the paging channels F0–F5 is assigned to two adjacent paging areas. The paging channels F0–F5 are defined to be main or priority channels which are first searched by each pager in order to determine a paging channel through which a message will be transmitted to that pager.

When the pager 10 is required, in one of the paging areas A1–A6, to ascertain the paging channel through which paging messages directed to the pager 10 is received, the pager 10 will be sequentially tuned to the channels F0–F5 in an ascending, descending or suitably determined order. Since each paging area A1–A6 is assigned to one of the channels F0–F5, the pager is eventually tuned to one of the channels F0–F5 after at most five channel searches.

It is assumed in this example that the pager with the FSN=12 initiates the channel search while located in the paging area A1 to which the main or priority channel F0 has been allocated (FIG. 11). If the pager 10 is sequentially tuned to the priority channels F0–F5 in an ascending order the pager 10 is first tuned to the channel F0. Then the controller 22 accesses the corresponding look-up table (viz., FIG. 5) in the memory 20. In this instance although, F0 is in use as shown in FIG. 11, the pager 10 with the FSN=12 fails to detect coincidence between the transmitted FSI=28 and any of the stored FSIs=30, 29, 27 and 22. Accordingly, the controller 22 of the pager 10 accesses a look-up table which has been stored in the memory 20 and which indicates the FSI/channel relationship shown in FIG. 5. This occurs because the pager 10 has already acknowledged that it is located in the paging area after being successfully tuned to the paging channel F0. Therefore, the front end 12 is directly tuned to the channel F11 in the next step in this particular case. Thus, the pager 10 detects the coincidence of the FSI=29 transmitted over the channel F11 with the FSI=29 stored in the pager. This means that the pager 10 is able to ascertain F11 as the channel assigned thereto. Subsequently, the pager 10 enters into a message waiting mode.

Figure 5:
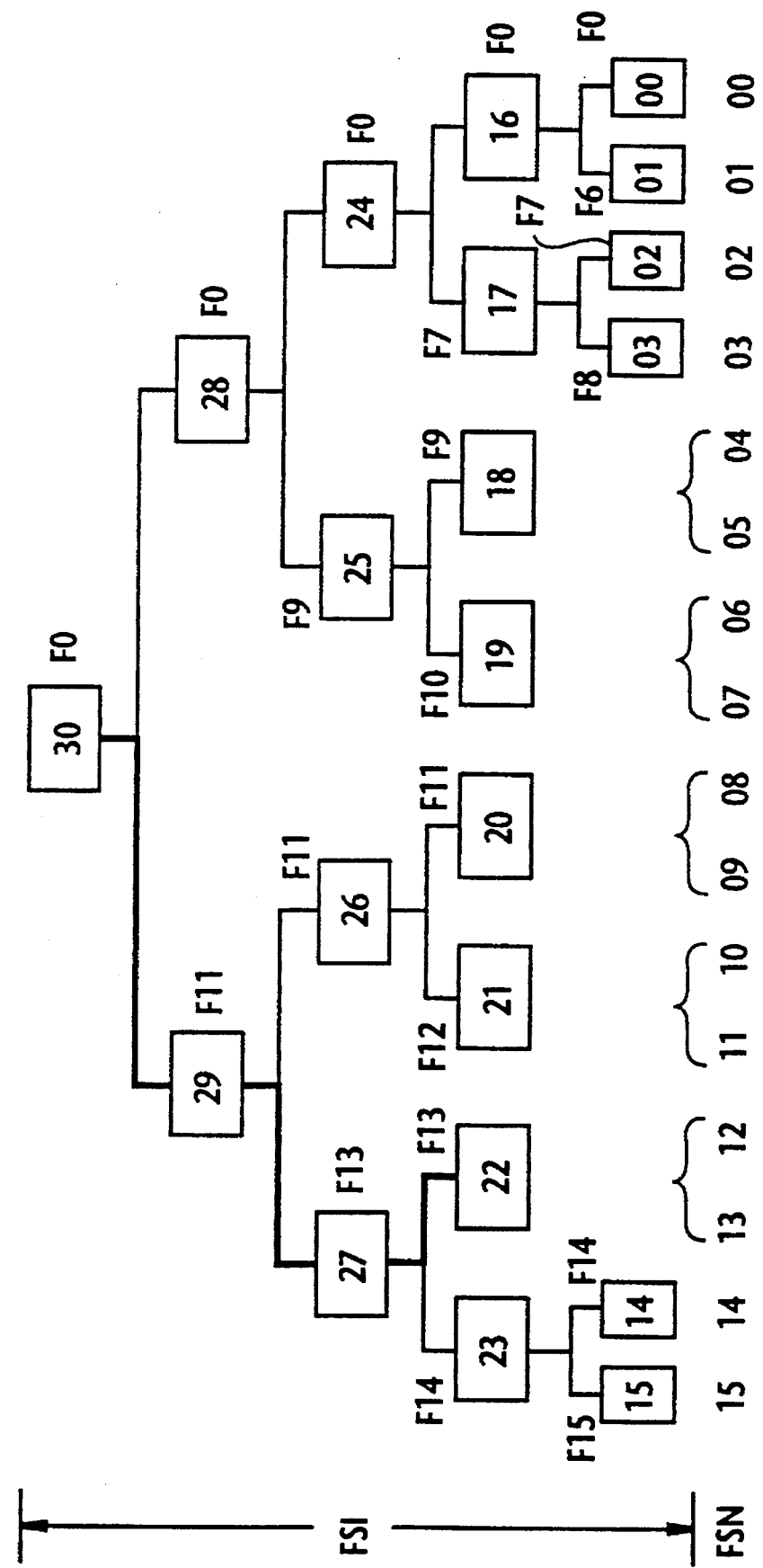
FIGS. 5 to 10 show a FSI/channels relationship for illustrating the present invention.
Figure 6:
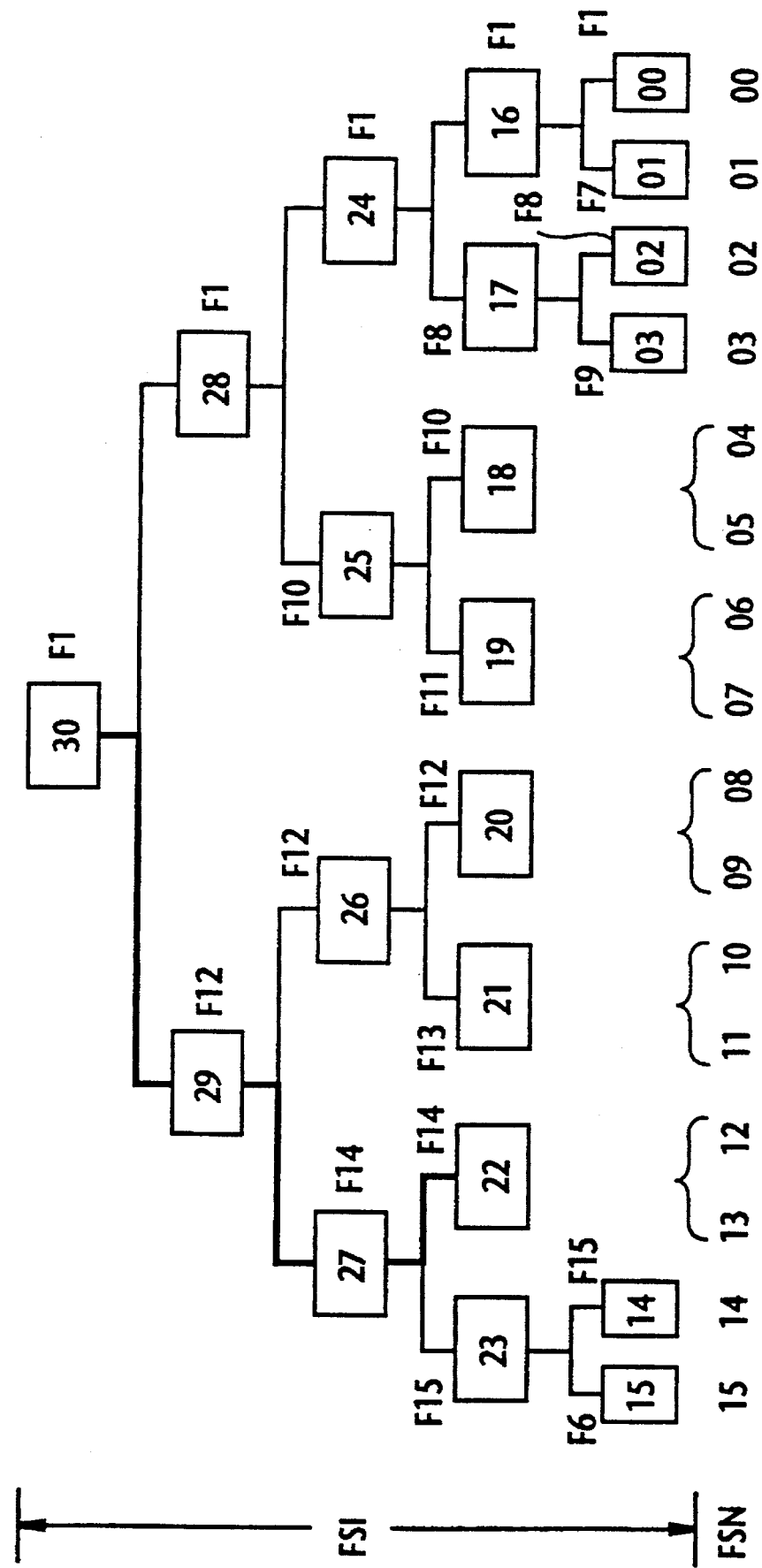
Figure 7:
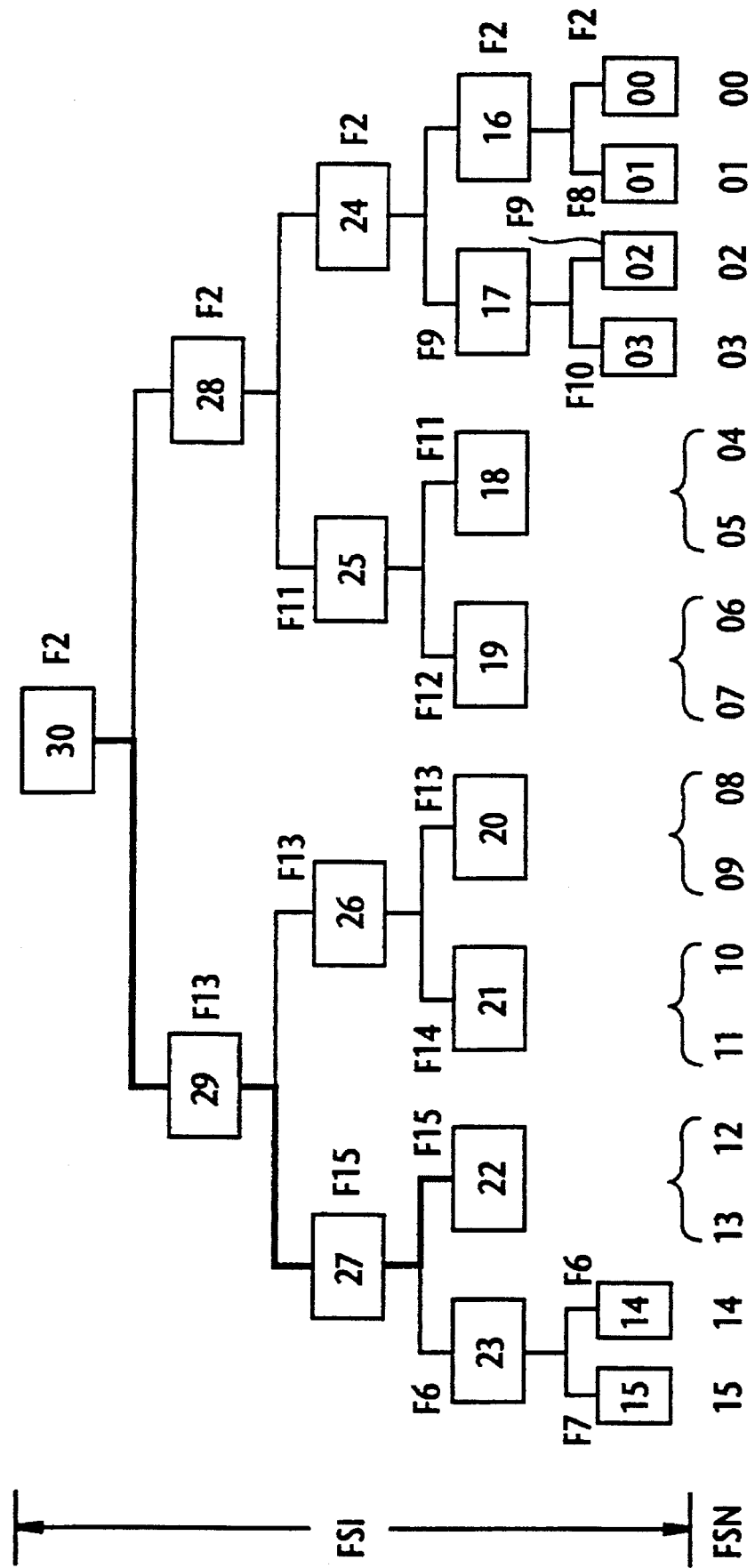
Figure 8:
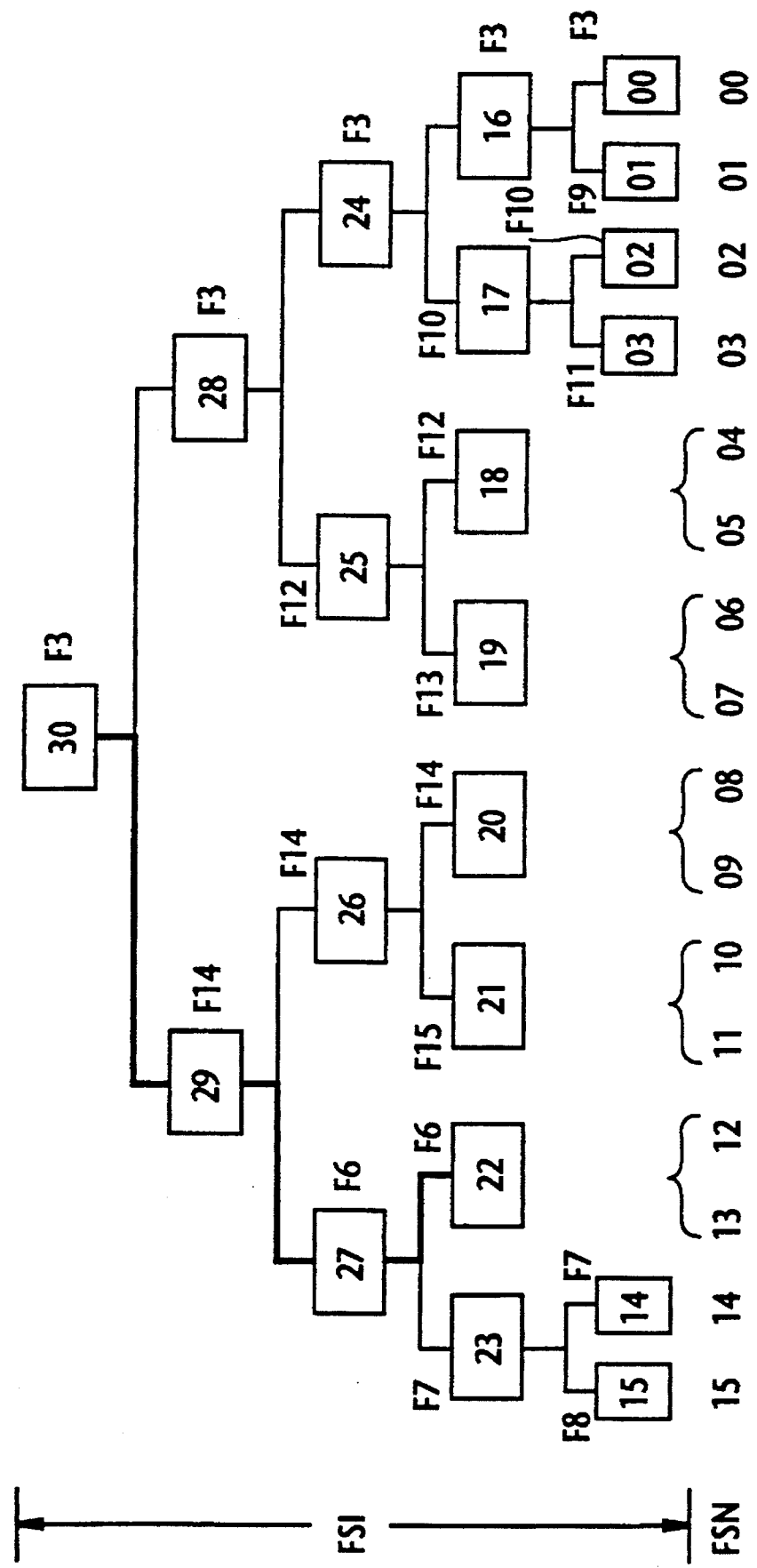
Figure 9:
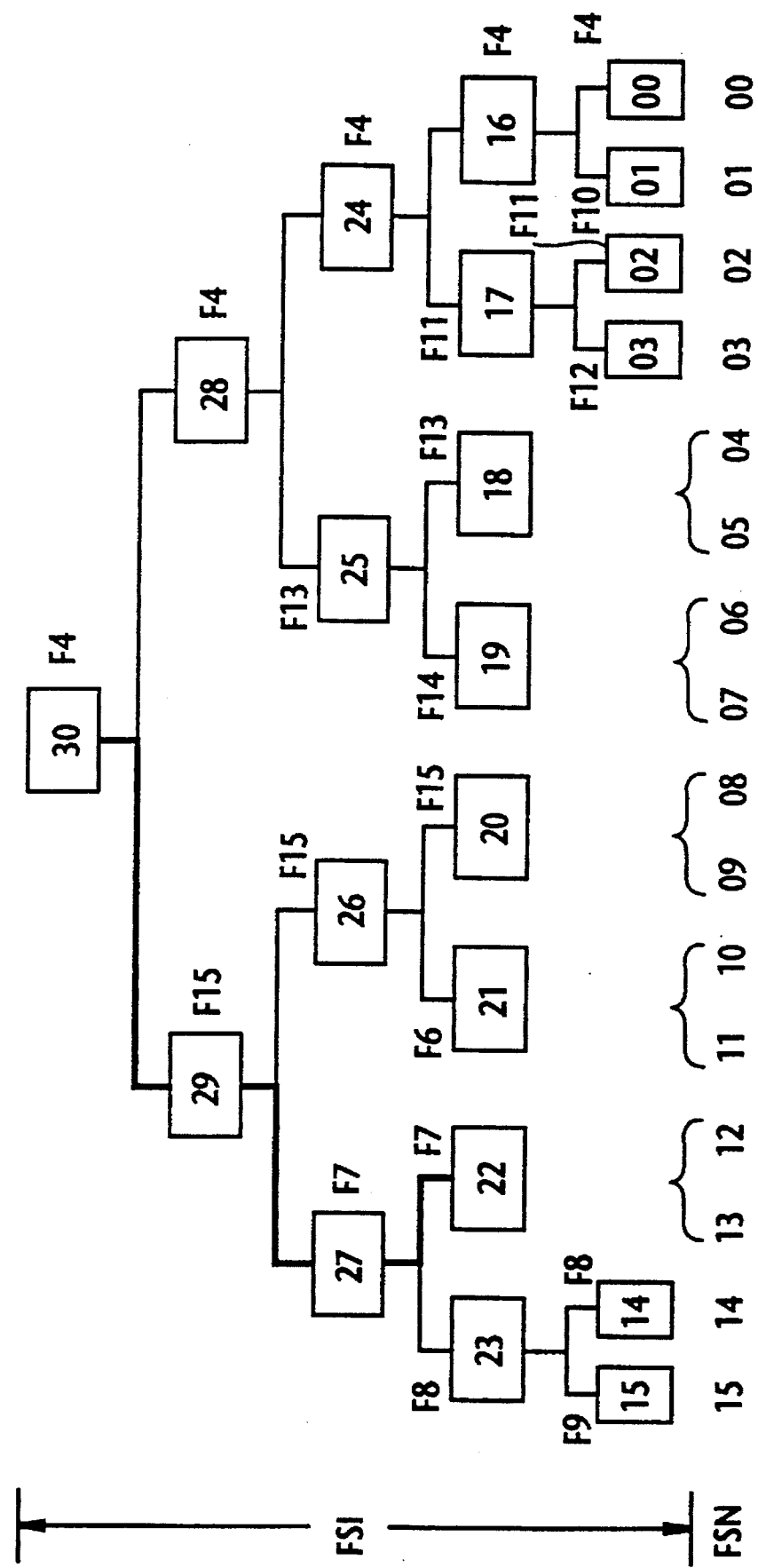
Figure 10:
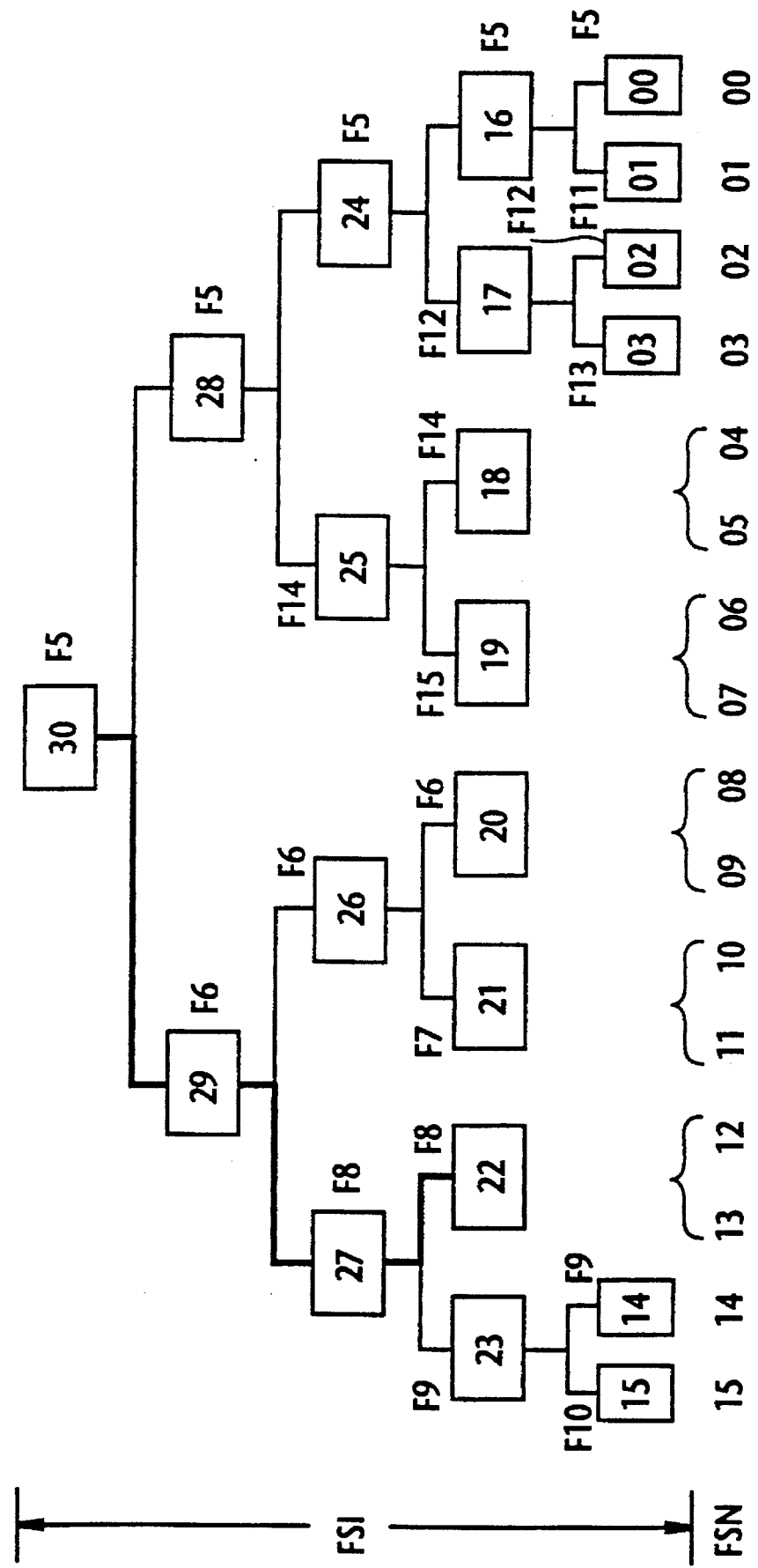

It is noted in FIG. 5 that a pager grouped into the FSN=00 is only tunable to the channel F0. Conversely, a pager related to the FSN=15 can be tuned to one of the five channels F0, F11, F13, F14 and F15.

The above discussions are applicable to other pagers with FSNs other than FSN=12 and also to the other paging areas A2–A6 to which main or priority channels F1–F5 are assigned respectively.

In the foregoing, the so-called priority channels which ere firstly searched for, are by no means limited to F0–F5 and also the number thereof is not limited to six. Further, the relationships between the FSIs and the channels corresponding thereto, shown in FIGS. 5–10, are merely exemplary and not restricted thereto, That is to say, the FSI/channel relationship can be altered to comply with situations which require modifications.

It will be understood that the above disclosure is representative of only one possible embodiment of the present invention and that the concept on which the invention is based is not specifically limited thereto.

What is claimed is:

1. A method of allocating pager channels to a plurality of paging areas in a multi-channel radio pager network system wherein each pager is previously assigned one frequency subset number (FSN) from among N defined FSNs, and wherein N pager channels are available, each of said FSNs defining M frequency subset indicators (FSIs), said FSIs being defined in the form of a tree with M levels, said method comprising the steps of:

(a) selecting a plurality of priority paging channels from among said N pager channels;

(b) allocating said plurality of priority paging channels to said plurality of service areas on a one-to-one basis such that no priority paging channel is assigned to two adjacent service areas;

(c) allocating the paging channels other than said priority paging channels to said FSIs corresponding to each of said paging areas; and (d) storing information in each of said pagers indicating the allocation of the paging channels to said FSIs corresponding to each of said paging areas.

2. A method as claimed in claim 1, wherein each of said pagers searches said plurality of priority paging channels in an ascending order, in preference to the paging channels other than said priority paging channels.

3. A method as claimed in claim 1, wherein each of said pagers searches said plurality of priority paging channels in an descending order, in preference to the paging channels other than said priority paging channels.

4. A method as claimed in claim 1, wherein if one of said pagers fails to detect a paging channel, among said plurality of said priority channels, through which messages are directed thereto, then said pager searches another paging channel among the paging channels other than said plurality of said priority paging channels by referring to said information.

* * * * *